US011976587B2

(12) United States Patent
Koehli et al.

(10) Patent No.: US 11,976,587 B2
(45) Date of Patent: May 7, 2024

(54) TWO-STROKE ENGINE AND METHOD FOR OPERATING A TWO-STROKE ENGINE

(71) Applicant: Andreas Stihl AG & Co. KG, Waiblingen (DE)

(72) Inventors: Robert Koehli, Winnenden (DE); Tilman Seidel, Stuttgart (DE); Jan Pawlowski, Poppenweiler (DE); Tobias Deigendesch, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/455,376

(22) Filed: Aug. 24, 2023

(65) Prior Publication Data

US 2023/0399974 A1 Dec. 14, 2023

Related U.S. Application Data

(62) Division of application No. 17/177,095, filed on Feb. 16, 2021, now Pat. No. 11,773,767.

(30) Foreign Application Priority Data

Feb. 15, 2020 (DE) .................... 10 2020 000 989.1

(51) Int. Cl.
*F02B 33/04* (2006.01)
*F02B 25/00* (2006.01)
(Continued)

(52) U.S. Cl.
CPC .............. *F02B 33/04* (2013.01); *F02B 25/00* (2013.01); *F02B 33/30* (2013.01); *F02D 9/02* (2013.01);
(Continued)

(58) Field of Classification Search
CPC .......... F02B 33/04; F02B 33/30; F02B 25/00; F02B 25/06; F02B 15/00; F02B 2075/025;
(Continued)

(56) References Cited

U.S. PATENT DOCUMENTS 5,992,358 A 11/1999 Otome
7,017,537 B2 3/2006 Osburg et al.
(Continued)

FOREIGN PATENT DOCUMENTS

DE 10301732 A1 7/2004
DE 10 2009 059 143 A1 6/2011
EP 1698772 A2 9/2006

*Primary Examiner* — Grant Moubry

(74) *Attorney, Agent, or Firm* — Walter Ottesen, P.A.

(57) ABSTRACT

A two-stroke engine includes a cylinder having a combustion chamber. The combustion chamber is delimited by a piston guided in a reciprocating manner in the cylinder and drives a crankshaft. A first intake channel opens into the crankcase interior. A transfer channel opens into the crankcase interior via a transfer window on a cylinder bore of the cylinder and via a passage opening. A second intake channel is provided for supplying scavenging air to the transfer channel. The first intake channel and the second intake channel are configured for supplying air. An injection valve configured for injecting the entire quantity of fuel to be supplied to the engine directly into the crankcase interior is
(Continued)

disposed on the crankcase. A method for operating a two-stroke engine provides that the entire quantity of fuel to be supplied to the engine via a metering installation is supplied directly to the crankcase interior.

46 Claims, 10 Drawing Sheets

(51) Int. Cl.

| | |
|---|---|
| ***F02B 33/30*** | (2006.01) |
| ***F02D 9/02*** | (2006.01) |
| ***F02F 1/22*** | (2006.01) |
| ***F02F 3/24*** | (2006.01) |
| ***F02M 35/10*** | (2006.01) |
| ***F02M 61/14*** | (2006.01) |
| *F02B 75/02* | (2006.01) |

(52) U.S. Cl.
CPC .................. *F02F 1/22* (2013.01); *F02F 3/24* (2013.01); *F02M 35/1019* (2013.01); *F02M 61/14* (2013.01); *F02B 2075/025* (2013.01)

(58) Field of Classification Search
CPC . F02D 9/02; F02D 9/107; F02D 41/30; F02D 2400/04; F02F 1/22; F02F 3/24; F02F 7/0021; F02F 7/0036; F02M 35/1019; F02M 61/14; F02M 69/044
See application file for complete search history.

(56) References Cited

U.S. PATENT DOCUMENTS

| | | | | |
|---|---|---|---|---|
| 7,025,021 | B1 | 4/2006 | Andersson et al. | |
| 7,089,892 | B1 * | 8/2006 | Hosaluk .................. | F02B 33/12 123/73 A |
| 7,331,315 | B2 | 2/2008 | Mavinahally | |
| 7,574,985 | B2 | 8/2009 | Kirchberger | |
| 8,534,268 | B2 | 9/2013 | Mavinahally et al. | |
| 8,677,954 | B2 | 3/2014 | Berneklev et al. | |
| 8,914,219 | B2 | 12/2014 | Neubauer et al. | |
| 10,329,994 | B2 | 6/2019 | Rieber et al. | |
| 2001/0032601 | A1 * | 10/2001 | Galka .................... | F02M 17/04 123/73 A |
| 2005/0155563 | A1 | 7/2005 | Yuasa et al. | |
| 2007/0125324 | A1 | 6/2007 | Houston | |
| 2009/0139485 | A1 * | 6/2009 | Pontoppidan ......... | F02B 23/104 123/305 |
| 2011/0000462 | A1 | 1/2011 | Ostojic et al. | |
| 2011/0061637 | A1 | 3/2011 | Mavinahally et al. | |
| 2011/0146642 | A1 | 6/2011 | Geyer et al. | |
| 2013/0340722 | A1 | 12/2013 | Osburg et al. | |
| 2014/0000537 | A1 | 1/2014 | Rieber et al. | |
| 2014/0061391 | A1 | 3/2014 | Ffield et al. | |
| 2021/0285362 | A1 * | 9/2021 | Kurata .................... | F02B 25/20 |

* cited by examiner

TWO-STROKE ENGINE AND METHOD FOR OPERATING A TWO-STROKE ENGINE

CROSS-REFERENCE TO RELATED APPLICATIONS

This application is a divisional application of U.S. patent application Ser. No. 17/177,095, filed Feb. 16, 2021, which, in turn, claims priority of German patent application no. 10 2020 000 989.1, filed Feb. 15, 2020, the entire contents of both applications are incorporated herein by reference.

BACKGROUND

Two-stroke engines having a first intake channel which by way of a first intake channel opening opens into the crankcase interior, and having a second intake channel for supplying scavenging gas shield air, are generally known. Such a two-stroke engine is derived from US 2011/0146642, for example. In the two-stroke engine known from this publication, a mixture of fuel/air is supplied to the crankcase interior by way of the first intake channel.

SUMMARY

It is an object of the invention to provide a two-stroke engine via which a high air mass flow rate can be obtained at low exhaust emissions. It is a further object of the invention to provide a method for operating a two-stroke engine that enables a high throughput of air at low exhaust emissions.

In terms of the two-stroke engine, the object can, for example, be achieved by a two-stroke engine including: a cylinder having a combustion chamber formed therein; a piston configured to be guided in a reciprocating manner in the cylinder; the combustion chamber being delimited by the piston; a crankcase defining a crankcase interior; a crankshaft rotatably mounted in the crankcase; the piston being configured to drive the crankshaft; a first intake channel which opens into the crankcase interior via a first intake channel opening; the first intake channel and the crankcase interior forming a first flow path; the combustion chamber having an outlet opening; the cylinder having a cylinder bore; at least one transfer channel opening via a transfer window at the cylinder bore and opening into the crankcase interior via a passage opening; the at least one transfer channel being configured to establish a fluidic connection between the crankcase interior and the combustion chamber in a region of bottom dead center of the piston; a second intake channel configured to supply scavenging air to the at least one transfer channel; a common throttle element configured to control the first intake channel and the second intake channel; the common throttle element being pivotably mounted via a throttle shaft; wherein a connection between the second intake channel and the at least one transfer channel and a connection between the first intake channel opening and the crankcase interior are controlled as a function of a rotary position of the crankshaft; and, an injection valve for supplying fuel, the injection valve being configured to supply to the first flow path an entire quantity of fuel to be supplied to the two-stroke engine.

The object can, for example, further be achieved via a two-stroke engine including: a cylinder having a combustion chamber formed therein; a piston configured to be guided in a reciprocating manner in the cylinder; the combustion chamber being delimited by the piston; a crankcase defining a crankcase interior; a crankshaft rotatably mounted in the crankcase; the piston being configured to drive the crankshaft; a first intake channel which opens into the crankcase interior via a first intake channel opening; the first intake channel and the crankcase interior forming a first flow path; a throttle element disposed in the first intake channel; the combustion chamber having an outlet opening; the cylinder having a cylinder bore; at least one transfer channel opening out via a transfer window at the cylinder bore and opening into the crankcase interior via a passage opening; the at least one transfer channel being configured to establish a fluidic connection between the crankcase interior and the combustion chamber in a region of bottom dead center of the piston; a second intake channel for supplying scavenging air to the at least one transfer channel; wherein a connection between the second intake channel and the at least one transfer channel and a connection between the first intake channel opening and the crankcase interior as a function of a rotary position of the crankshaft are controlled in such a manner that the connection between the second intake channel and the at least one transfer channel during an upward stroke of the piston is established before the connection between the first intake channel opening and the crankcase interior; and, a metering device for supplying fuel, the metering device being configured to supply to the first flow path an entire quantity of fuel to be supplied to the two-stroke engine downstream of the throttle element.

The object can, for example, further be achieved via a two-stroke engine including: a cylinder having a combustion chamber formed therein; a piston configured to be guided in a reciprocating manner in the cylinder; the combustion chamber being delimited by the piston; a crankcase defining a crankcase interior; a crankshaft rotatably mounted in the crankcase; the piston being configured to drive the crankshaft; a first intake channel which opens into the crankcase interior via a first intake channel opening; the first intake channel and the crankcase interior forming a first flow path; a first throttle element arranged in the first intake channel; the combustion chamber having an outlet opening; the cylinder having a cylinder bore; at least one transfer channel opening via a transfer window at the cylinder bore and opening into the crankcase interior via a passage opening; the at least one transfer channel being configured to establish a fluidic connection between the crankcase interior and the combustion chamber in a region of bottom dead center of the piston; a second intake channel configured to supply scavenging air to the at least one transfer channel; a second throttle element arranged in the at least one second intake channel; the first intake channel and the second intake channel being formed separate from each other; wherein a connection between the second intake channel and the at least one transfer channel and a connection between the first intake channel opening and the crankcase interior are controlled as a function of a rotary position of the crankshaft; and, an injection valve for supplying fuel, the injection valve being configured to supply an entire quantity of fuel to be supplied to the two-stroke engine to the first flow path.

For a two-stroke engine according to an embodiment it is provided that the first intake channel and the second intake channel are configured for supplying air, and that a metering installation is provided for supplying fuel, the metering installation being configured for supplying directly to the crankcase interior the entire quantity of fuel to be supplied to the two-stroke engine.

On account of both intake channels being configured for supplying air, a high throughput of air can be achieved at low exhaust emissions. In known two-stroke engines in which the fuel is supplied to the crankcase interior by way of the first intake channel, it has to be ensured in particular at low rotating speeds and under partial load that a sufficient quantity of fuel makes its way into the combustion chamber. On account thereof, the possible maximum flow cross section of the second supply channel which supplies scavenging gas shield air is limited. It has now been demonstrated that, on account of supplying directly to the crankcase interior space the entire quantity of fuel to be supplied to the two-stroke engine, it can also be ensured at low rotating speeds and under partial load that a sufficient quantity of fuel makes its way into the combustion chamber. The volume of the transfer channels can nevertheless be configured so as to be comparatively large. On account thereof, low exhaust emissions of the two-stroke engine result in particular under full load. The flow cross section of the second intake channel can be chosen so as to be comparatively large because the pressure fluctuations which are created in the first intake channel as a function of the rotating speed do not influence the quantity of fuel supplied to the crankcase interior. On account of the entire quantity of air to be supplied to the internal combustion engine being supplied by way of two channels, specifically the first intake channel and the second intake channel, an overall comparatively small construction size of the two-stroke engine can be implemented. In particular, the openings which are to be provided on the cylinder liner can be kept comparatively small.

The fuel is in particular injected into the crankcase interior.

On account of two channels, specifically the first intake channel and the second intake channel, being provided for supplying air, and the entire quantity of fuel to be supplied being supplied directly to the crankcase interior, it can be ensured in particular at low rotating speeds that the supplied fuel is made available to the internal combustion engine for combustion with only a minor temporal delay. The temporal delay which in the fuel supply to the intake channel arises on account of the fuel first having to be transported by way of the intake channel into the crankcase and from there by way of the at least one transfer channel into the combustion chamber is reduced. An improved running performance is achieved in particular at low rotating speeds.

The two-stroke engine advantageously has an air filter, and the first intake channel connects the clean room of the air filter to the crankcase interior, and the second intake channel connects the clean room of the air filter to the at least one transfer channel.

In an embodiment, air which is free of fuel is exclusively supplied by way of the first intake channel and by way of the second intake channel in each operating state, thus when idling, under partial load and under full load.

The first intake channel opening is advantageously controlled by the piston. On account thereof, the timings of the first intake channel opening are independent of the pressure ratios arising during the operation and are exclusively a function of the rotary position of the crankshaft or the position of the piston, respectively.

In an alternative embodiment it can be provided that the first intake channel opening is controlled by a diaphragm valve as a function of the prevailing pressure. Electrical controlling or indirect mechanical controlling of the first intake channel opening may also be provided.

The second intake channel advantageously opens out by way of a second intake channel opening on the cylinder bore. In an embodiment, the second intake channel on the cylinder branches out into at least two branches. The at least two branches of the second intake channel advantageously open out by way of in each case one second intake channel opening on the cylinder bore on opposite sides of the cylinder bore. The at least one second intake channel opening is preferably controlled by the piston. The two second intake channel openings of the two branches of the second intake channel are particularly preferably controlled by the piston.

The piston advantageously has at least one piston pocket. The at least one piston pocket, in particular in the region of the top dead center of the piston, connects the second intake channel opening to the at least one transfer window. In an embodiment, the piston possesses two piston pockets, wherein each piston pocket connects one second intake channel opening to at least one transfer window. At least one piston pocket preferably establishes a connection to two transfer windows. The two-stroke engine advantageously possesses four transfer windows. Positive purging of the combustion chamber is enabled on account thereof. Two branches of the second intake channel are in each case preferably to be connected to two transfer windows.

The connection between the second intake channel opening and the at least one transfer channel by way of the at least one piston pocket is preferably performed during the upward stroke of the piston. The connection between the second intake channel opening and the at least one transfer channel by way of the at least one piston pocket is preferably performed during the upward stroke of the piston, prior to the first intake channel opening being connected to the crankcase interior. On account thereof, the quantity of air supplied by way of the second intake channel opening can be significantly increased in comparison to an approximately simultaneous connection between the first and the second intake channel opening. The connection between the second intake channel and the at least one transfer channel by way of the at least one piston pocket during the upward stroke of the piston is advantageously performed at least 5° in terms of the crankshaft angle, in particular at least 15° in terms of the crankshaft angle, before the connection between the first intake channel opening and the crankcase interior. The connection between the second intake channel opening and the at least one transfer channel and the connection between the first intake channel opening and the crankcase interior are adapted to one another. The identification of the air throughput and the proportion of clean air can be defined by adapting the timings of the connection between the second intake channel opening and the at least one transfer channel and the connection between the first intake channel opening and the crankcase interior. The timings and the channel cross sections herein influence one another and cannot be established in a mutually independent manner.

The connection between the second intake channel and at least one transfer channel by way of the at least one piston pocket during the upward stroke of the piston is preferably performed at most 70° in terms of the crankshaft angle, preferably at most 40° in terms of the crankshaft angle, before the connection between the intake channel opening and the crankcase interior. Advantageous pressure ratios in the channels result on account thereof.

The first intake channel opens into the crankcase interior by way of a first intake channel opening. An outlet opening leads out of the combustion chamber of the two-stroke engine. At least one inlet-proximal transfer channel and at least one outlet-proximal transfer channel are advantageously provided. The inlet-proximal transfer channel advantageously opens out by way of an inlet-proximal transfer window on the cylinder bore. The outlet-proximal transfer channel advantageously opens out by way of an outlet-proximal transfer window on the cylinder bore. The inlet-proximal transfer window during the upward stroke of the piston is advantageously connected to the piston pocket before or simultaneously with the outlet-proximal transfer window. The point in time at which the inlet-proximal transfer window and the outlet-proximal transfer window are connected to the piston pocket herein is a result of the configuration and the position of the transfer windows and the piston pocket. The piston and the transfer windows are accordingly configured such that the stated timings are derived during the upward stroke of the piston. The inlet-proximal transfer channel and the outlet-proximal transfer channel advantageously have a common transfer channel section. Opening the inlet-proximal transfer channel toward the piston pocket before opening the outlet-proximal transfer window is advantageous in particular when the inlet-proximal transfer channel and the outlet-proximal transfer channel have the common transfer channel section, wherein the inlet-proximal transfer channel up to the common transfer channel section has a greater length than the outlet-proximal transfer channel. On account of the inlet-proximal transfer window being connected to the piston pocket before the outlet-proximal transfer window, an improved shielding by clean air can be achieved in the inlet-proximal transfer channel section. The more sluggish dynamic characteristic of the longer inlet-proximal transfer channel and the greater volume of the latter can thus be at least partially compensated for.

In an embodiment the timings at which the inlet-proximal transfer window and the outlet-proximal transfer window are connected to the piston pocket are established by a corresponding configuration of the upper edge of the piston pocket that lies so as to face the combustion chamber. In an embodiment the upper edge of the piston pocket has a stepped profile. On account thereof, different timings for connecting the inlet-proximal and the outlet-proximal transfer windows to the piston pocket are advantageously achieved. It is additionally advantageously provided that the upper edge of the piston pocket has a profile which is adapted to an inclination of the upper edges of the transfer windows. The upper edge of the piston pocket preferably runs parallel to the upper edge of the transfer windows. It can alternatively be provided that the upper edge of the piston pocket runs in a plane which lies so as to be perpendicular to the longitudinal center axis of the cylinder. In a lateral view of the piston, the upper edge of the piston pocket in the case of this configuration forms a straight line.

The inlet-proximal transfer window during the upward stroke of the piston is advantageously connected to the piston pocket at most 10°, in particular 10° to 4°, before the outlet-proximal transfer window.

In an alternative embodiment the inlet-proximal transfer window is connected to the piston pocket after the outlet-proximal transfer window.

The transfer windows during the downward stroke of the piston preferably open simultaneously into the combustion chamber.

In an alternative embodiment it can be provided that the outlet-proximal transfer window opens into the combustion chamber before the inlet-proximal transfer window. The outlet-proximal transfer window advantageously opens into the combustion chamber less than 10° in terms of the crankshaft angle, in particular less than 5° in terms of the crankshaft angle, before the inlet-proximal transfer window.

The passage opening by way of which the at least one transfer channel opens into the crankcase interior is advantageously a common passage opening at which the outlet-proximal transfer channel and the inlet-proximal transfer channel conjointly open into the crankcase interior. The outlet-proximal transfer channel and the inlet-proximal transfer channel advantageously have a common transfer channel section by way of which the channels are routed up to the passage opening.

The cylinder advantageously has a longitudinal center axis, and the two-stroke engine when viewed in the direction of the longitudinal center axis is divisible into four sectors. A first sector completely contains the first intake channel opening. A second sector adjacent to the first sector contains an outlet-proximal transfer window and an inlet-proximal transfer window. A third sector adjacent to the second sector completely contains the outlet opening. A fourth sector is adjacent to the first sector and the third sector. In an embodiment, the passage opening at which the outlet-proximal transfer channel and the inlet-proximal transfer channel conjointly open into the crankcase interior is disposed in a common sector adjacent to the second sector. In an embodiment the passage opening is disposed in the third sector which completely contains the outlet opening. In an alternative embodiment the passage opening is disposed in the first sector. On account of the passage opening and the transfer windows being disposed in different sectors of the two-stroke engine, the at least one transfer channel is guided about the longitudinal center axis of the cylinder. A great length of the transfer channel can be achieved in a simple manner on account thereof. In an embodiment the outlet-proximal transfer channel and the inlet-proximal transfer channel run in a helical manner about the longitudinal center axis of the cylinder. The outlet-proximal transfer window and the inlet-proximal transfer window advantageously do not extend into adjacent sectors, thus do not protrude into the first sector or the third sector. Inlet-proximal transfer windows and outlet-proximal transfer windows advantageously extend exclusively in the second sector and in the fourth sector.

An outlet-proximal transfer window and an inlet-proximal transfer window which by way of transfer channels are connected to the passage opening are advantageously disposed in the fourth sector. Accordingly, a total of two outlet-proximal transfer windows and two inlet-proximal transfer windows which open into the crankcase interior at the common passage opening are provided. In an embodiment all transfer channels have a common transfer channel section that adjoins the passage opening.

At the top dead center of the piston the first intake channel opening is advantageously opened toward the crankcase interior. On account thereof, in the region of the top dead center air from the first intake channel flows by way of the first intake channel opening into the crankcase interior.

The quantity of air supplied by way of the at least one second intake channel and the first intake channel is a function of the channel length, timings, and throttle locations of the channels. The two-stroke engine is advantageously configured such that the at least one second intake channel is configured for supplying at least half of the entire quantity of air to be supplied to the two-stroke engine at the nominal rotating speed. The nominal rotating speed herein is the rotating speed of the rated output point. In the case of more than one second intake channel, the second intake channels are conjointly configured for supplying at least half of the entire quantity of air to be supplied to the two-stroke engine at the nominal rotating speed. In an embodiment 60% to 90%, in particular 65% to 75%, of the entire quantity of air to be supplied to the two-stroke engine at the nominal rotating speed is supplied by way of the second intake channel or the second intake channels. Accordingly, at most half, in particular less than half, of the quantity of air to be supplied to the two-stroke engine at the nominal rotating speed reaches the crankcase interior directly by way of the first intake channel and the first intake channel opening. At least half of the quantity of air supplied is supplied to the crankcase interior by way of the at least one second intake channel, the at least one piston pocket and the transfer channels.

On account of the fuel being supplied directly to the crankcase interior by way of a metering installation, in particular by way of an injection valve, it is possible for a significant proportion of the quantity of air to be supplied at the nominal rotating speed to be supplied by way of the at least one second intake channel. On account of the fuel being supplied directly to the crankcase interior by way of the injection valve, fluctuations in the rotating speed and an unstable running performance of the two-stroke engine can be avoided even at low rotating speeds and under partial load.

For a method for operating a two-stroke engine it is provided that during the operation air is supplied by way of the first intake channel and the at least one second intake channel, and that the entire quantity of fuel to be supplied to the two-stroke engine by way of a metering installation is supplied directly to the crankcase interior. On account thereof, a high air mass flow rate through the two-stroke engine can be achieved at low exhaust emissions.

The metering installation is in particular an injection valve that is disposed on the crankcase.

For a two-stroke engine it is provided according to an embodiment that the connection between the second intake channel and the at least one transfer channel and the connection between the first intake channel opening and the crankcase interior as a function of the rotary position of the crankshaft are controlled in such a manner that the connection between the second intake channel and the at least one transfer channel is performed before the connection between the first intake channel opening and the crankcase interior, and that a metering installation is provided for supplying fuel, the metering installation downstream of the throttle element being configured for supplying to the first flow path the entire quantity of fuel to be supplied to the two-stroke engine.

Accordingly, the metering installation can supply the fuel to the first intake channel downstream of the throttle element or directly to the crankcase interior. On account of the fuel being supplied to the first flow path downstream of the throttle element, a sufficient supply of fuel to the crankcase interior can be ensured even when the connection between the second intake channel and the at least one transfer channel during the upward stroke of the piston is performed before the connection between the first intake channel opening and the crankcase interior. By virtue of the connection between the second intake channel and the at least one transfer channel during the upward stroke of the piston being performed before the connection between the first intake channel opening and the crankcase interior, a sufficient supply of air to the transfer channels for ensuring positive purging of the combustion chamber is ensured despite a comparatively great flow resistance. The comparatively great flow resistance herein results in particular by virtue of a piston pocket by way of which the scavenging gas shield air from the second intake channel is supplied to the at least one transfer channel. The piston pocket usually forms a constriction in the flow path that determines the flow resistance.

The volume of the transfer channels can be configured so as to be comparatively large. Low exhaust emissions of the two-stroke engine are derived in particular under full load on account thereof. The flow cross section of the second intake channel can be chosen so as to be comparatively large since the pressure fluctuations which are created in the first intake channel as a function of the rotating speed do not influence the quantity of fuel supplied to the crankcase interior. An overall comparatively minor construction size of the two-stroke engine can be implemented on account of the entire quantity of air to be supplied to the internal combustion engine being supplied by way of two channels, specifically the first intake channel and the second intake channel. In particular, the openings which are to be provided on the cylinder liner can be kept comparatively small.

For a two-stroke engine it is provided according to an embodiment that a first throttle element is disposed in the first intake channel and a second throttle element is disposed in the second intake channel. The first intake channel and the second intake channel are configured separately from one another. An injection valve which is configured for supplying to the first flow path the entire quantity of fuel to be supplied to the two-stroke engine is provided for supplying fuel.

On account of an injection valve being provided for supplying fuel, a sufficient quantity of fuel can be supplied in particular at high rotating speeds. A sufficient quantity of shielding air can be achieved in the at least one transfer channel in order to achieve low exhaust emissions by way of the second intake channel which is configured separately from the first intake channel. The flow cross section of the second intake channel can be chosen so as to be comparatively large since the pressure fluctuations which are created in the first intake channel as a function of the rotating speed do not influence the quantity of fuel supplied to the crankcase interior. An overall comparatively minor construction size of the two-stroke engine can be implemented on account of the entire quantity of air to be supplied to the internal combustion engine being supplied by way of two channels, specifically the first intake channel and the second intake channel. In particular, the openings which are to be provided on the cylinder liner can be kept comparatively small.

For a two-stroke engine it is provided according to an embodiment that both intake channels are controlled by a common throttle element. The throttle element is pivotably mounted by way of a throttle shaft. The first intake channel and the second intake channel at least downstream of the throttle shaft are configured separately from one another. An injection valve is provided for supplying fuel, the injection valve being configured for supplying to the first flow path the entire quantity of fuel to be supplied to the two-stroke engine.

It can be provided that the first intake channel and the second intake channel are also configured separately from one another upstream of the throttle shaft, for example by way of a partition wall section that is disposed upstream of the throttle shaft.

BRIEF DESCRIPTION OF DRAWINGS

The invention will now be described with reference to the drawings wherein:

FIG. 8 to FIG. 15 show developed views of the piston and of the cylinder bore in different positions of the piston during one piston stroke, wherein FIGS. 13 to 15 show an alternative embodiment; and, FIGS. 16 and 17 show schematic illustrations of the air-filled interiors of alternative embodiments of two-stroke engines, wherein the piston as a filled element, the crankcase interior for the position of the piston at the bottom dead center, and the combustion chamber are not illustrated, and wherein an injection valve and throttle elements have been added.

DETAILED DESCRIPTION

Figure 1:
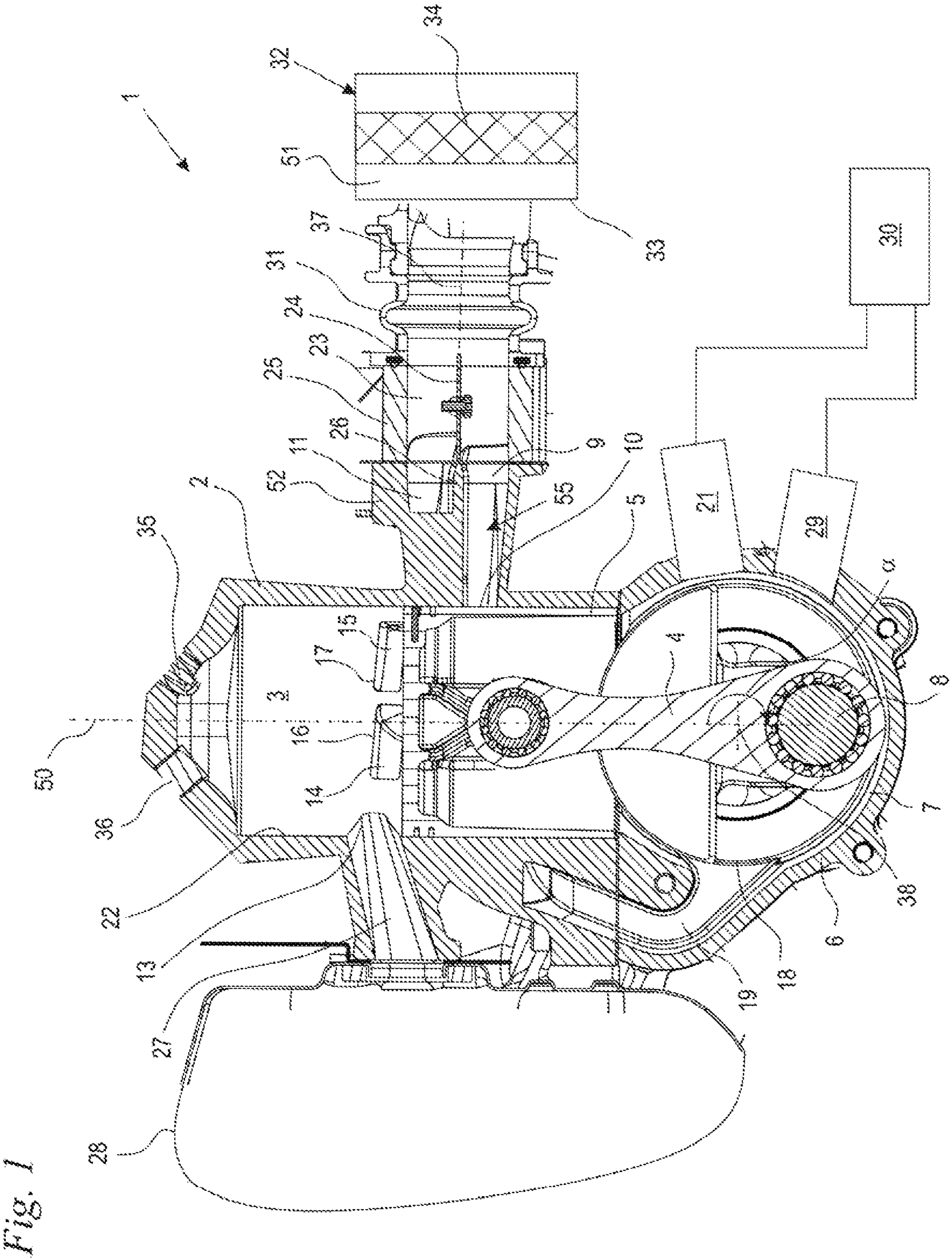
FIG. 1 shows a schematic sectional illustration of a two-stroke engine.

FIG. 1 schematically shows a two-stroke engine 1 which can be used, for example, as a drive motor in a hand-held work apparatus such as an angle grinder, a power saw, a brushcutter, a leaf blower, or the like. The two-stroke engine 1 is configured as a one-cylinder engine and possesses a cylinder 2 in which a combustion chamber 3 is configured. The combustion chamber 3 is delimited by a piston 5. The piston 5 is mounted in the cylinder 2 so as to be movable in a reciprocating manner in the direction of a longitudinal center axis 50 of the cylinder 2. The piston 5 by way of a connecting rod 4 drives a crankshaft 8 which is mounted in a crankcase 6 so as to be rotatable about a rotational axis 38. The rotating movement of the crankshaft 8 advantageously serves for driving a tool of the work apparatus.

The two-stroke engine 1 when in operation suctions air by way of an air filter 32. The air filter 32 possesses a filter material 34 which separates a contaminated side from a clean room 51 of the air filter 32. A preliminary air cleaning unit which may include one or a plurality of cyclones, for example, can be connected to the contaminated side of the air filter 32. The filter material 34 in the embodiment is held on an air filter base 33 which is part of a housing of the air filter 32. A connecting piece 31 which connects the clean room 51 of the air filter 32 to the cylinder 2 of the two-stroke engine 1 adjoins the air filter base 33.

When viewed in the flow direction from the air filter 32 to the cylinder 2, or to the crankcase 6, respectively, a throttle housing 25 is disposed between the connecting piece 31 and the cylinder 2. In the embodiment, the throttle housing 25 by way of an intervening seal (not illustrated) is fixed directly to the cylinder 2. The throttle housing 25 is disposed on a connecting flange 52 of the cylinder 2. Further components between the throttle housing 25 and the cylinder 2 are not provided in the embodiment. A throttle element 24 which controls the available flow cross section through the throttle housing 25 is rotatably mounted in the throttle housing 25. The throttle element 24 in the embodiment is a throttle flap. Another embodiment of the throttle element 24 may also be advantageous. In the operation of the two-stroke engine 1, the throttle element 24 is advantageously manually activated by a user via a throttle lever (not illustrated). The user can advantageously control the rotating speed of the two-stroke engine 1 by activating the throttle lever.

The two-stroke engine 1 possesses a first intake channel 9 which opens out by way of a first intake channel opening 10 on a cylinder bore 22 that is configured in the cylinder 2. The first intake channel opening 10 forms an inlet to the crankcase 6. The first intake channel opening 10 in the embodiment is controlled by a slot on the piston skirt of the piston 5. The piston 5 in a function of the position thereof in the cylinder bore 22 accordingly exposes the first intake channel opening 10 and connects the first intake channel 9 to a crankcase interior 7 configured in the crankcase 6, or closes the first intake channel opening 10. The position and the direction of movement of the piston 5 is a function of the rotary position of the crankshaft 8. The opening and closing of the first intake channel opening 10 therefore takes place at rotary positions of the crankshaft 8 that are predefined in terms of construction. The two-stroke engine 1 moreover possesses a second intake channel 11 which serves for supplying scavenging gas shield air to the transfer channels 14 and 15 of the two-stroke engine 1. In the embodiment the cylinder 2 possesses four transfer channels, specifically two outlet-proximal transfer channels 14 and two inlet-proximal transfer channels 15. In the sectional illustration of FIG. 1, one outlet-proximal transfer channel 14 and one inlet-proximal transfer channel 15 are disposed in front of the sectional plane and are therefore invisible. The outlet-proximal transfer channels 14 open out by way of outlet-proximal transfer windows 16 on the cylinder bore 22. The inlet-proximal transfer channels 15 open out by way of inlet-proximal transfer windows 17 on the cylinder bore 22. The transfer windows 16 and 17 are likewise controlled by the piston 5. The transfer windows 16 and 17 are accordingly slot-controlled. The transfer windows 16 and 17 in the position of the piston 5 in the bottom dead center shown in FIG. 1 are opened toward the combustion chamber 3.

As is shown in FIG. 1, an outlet channel 27 which by way of an outlet opening 13 in the cylinder bore 22 is connected to the combustion chamber 3 leads out of the combustion chamber 3. The outlet opening 13 forms an outlet from the combustion chamber 3. The outlet opening 13 is also controlled by the piston 5 and is opened or closed as a function of the position of the piston 5, and thus as a function of the rotary position of the crankshaft 8. The outlet channel 27 opens into an exhaust muffler 28. As is schematically shown in FIG. 1, a decompression valve 36 as well as a spark plug 35 are advantageously disposed on the cylinder 2. The decompression valve 36 can simplify the starting of the two-stroke engine 1 by reducing the pressure in the combustion chamber 3.

The first intake channel 9 and the second intake channel 11 serve for supplying air to the two-stroke engine 1. Air which is free of fuel is exclusively supplied by way of the first intake channel 9 and the second intake channel 11 in the embodiment. The supply of fuel takes place by way of a metering installation. The metering installation in the embodiment is an injection valve 21. The injection valve 21 is schematically illustrated in FIG. 1. The injection valve 21 in the embodiment is disposed on the crankcase 6. The injection valve 21 advantageously supplies fuel directly to a crankcase interior 7 which is configured in the crankcase 6. Another type of metering installation, in particular a metering installation which supplies the fuel directly to the crankcase interior 7 can however also be advantageous. The entire quantity of fuel to be supplied to the two-stroke engine 1 is introduced into the crankcase interior 7 by way of the metering installation. The entire quantity of fuel to be supplied to the two-stroke engine 1 is advantageously supplied directly to the crankcase interior 7 by way of the injection valve 21 disposed on the crankcase 6. In an alternative embodiment it can also be provided that the metering installation is connected to the crankcase 6 by way of a channel connection or a hose connection in order for fuel to be supplied to the crankcase interior 7.

The first intake channel 9 and the crankcase interior 7 form a first flow path 55. The entire quantity of fuel to be supplied to the two-stroke engine 1 is advantageously supplied to the first flow path 55 downstream of the throttle element 24. In an alternative embodiment it can accordingly be provided that the fuel is supplied to the first intake channel 9 downstream of the throttle element 24.

It is provided that the injection valve 21 supplies the fuel to the crankcase interior 7 at a very low fuel pressure. The fuel pressure can be, for example, 100 mbar in terms of positive pressure in relation to the ambient pressure. In order for the quantity of fuel to be supplied to be controlled, the injection valve 21 is connected to a schematically illustrated control device 30.

A pressure sensor 29 which is likewise connected to the control device 30 is disposed on the crankcase 6 in the embodiment. The control device 30 via the rotating speed as well as via signals delivered by the pressure sensor 29 as well as by potentially other sensors, for example by temperature sensors, controls the quantity of fuel to be supplied to the two-stroke engine 1 by way of the injection valve 21. The rotating speed of the two-stroke engine 1 is preferably made available to the control device 30 by a generator (not illustrated). The entire quantity of fuel supplied to the two-stroke engine 1 is supplied via the injection valve 21. No further installations for supplying fuel are provided.

In the embodiment the transfer channels 14 and 15 open into the crankcase interior 7 by way of a passage opening 18. The transfer channels 14 and 15 in the region of the bottom dead center of the piston 5 establish a fluidic connection between the crankcase interior 7 and the combustion chamber 3. The transfer channels 14 and 15 have a common transfer channel section 19. The common transfer channel section 19 adjoins the passage opening 18 in the direction toward the transfer windows 16 and 17.

The intake channels 9 and 11 in the throttle housing 25 and in the connecting piece 31 are guided in a common channel section 23. The available flow cross section of the first intake channel 9 and the available flow cross section of the second intake channel 11 are controlled by the common throttle element 24. It can be provided that the intake channels 9 and 11 at least in sections also in the common intake channel section 23 are separated by a partition wall section 37 which is schematically illustrated in FIG. 1. The partition wall section 37 can extend into the connecting piece 31 and/or into the clean room 51 of the air filter 32. For the purpose of decoupling vibrations, the connecting piece 31 can preferably be composed of an elastomer.

The connecting flange 52 of the cylinder 2, on which the throttle housing 25 is disposed, advantageously has a partition wall section 26 which separates the first intake channel 9 and the second intake channel 11 from one another. It can be provided that the throttle element 24 in the completely opened position bears on the partition wall section 26 and/or on the partition wall section 37 such that the intake channels 9 and 11 are largely or completely separated. On account thereof, cross flows between the first intake channel 9 and the second intake channel 11 are largely avoided. Cross flows can lead to delamination and turbulences and thus to pressure losses, and on account thereof can reduce the throughput of air.

Figure 2:
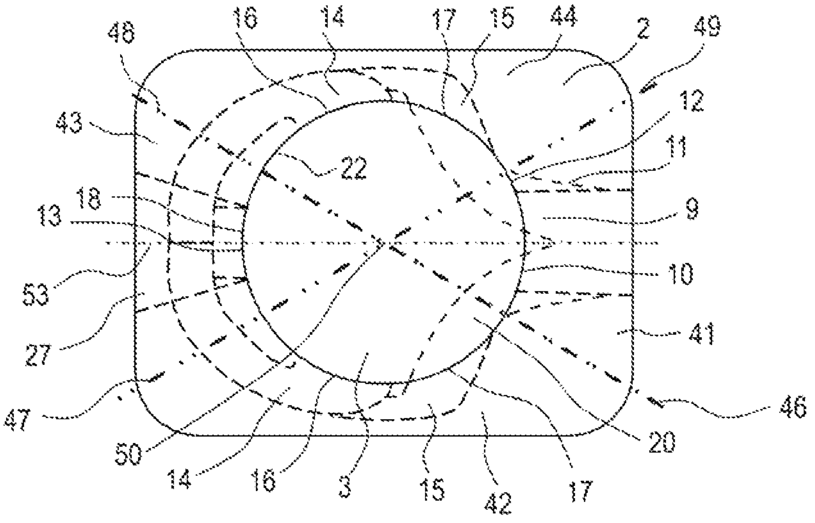
FIG. 2 shows a schematic illustration of the cylinder of the two-stroke engine in a view in the direction of the longitudinal center axis of the cylinder, viewed in the direction from the combustion chamber to the crankcase.

FIG. 2 shows a schematic view of the cylinder 2 when viewed in the direction of the longitudinal center axis 50 from the combustion chamber 3 viewed in the direction toward the crankcase interior 7. The outer delimitation line in the embodiment represents the external contour of the cooling ribs of the cylinder 2. As is shown in FIG. 2, the cylinder 2 by way of planes 46, 47, 48 and 49 is divisible into four sectors 41, 42, 43 and 44. The planes 46, 47, 48 and 49 proceed in a star-shaped manner from the longitudinal center axis 50 and contain the longitudinal center axis 50. The planes 46, 47, 48 and 49 in FIG. 2 are plotted using a chain-dotted line. The sectors 41, 42, 43 and 44 extend in the manner of pie slices about the longitudinal axis 50. The intake channel opening 10 is completely disposed in the first sector 41. In the embodiment the first intake channel 9 also completely extends in the first sector 41. In the illustrated view onto the cylinder 2 in the viewing direction from the combustion chamber 3 toward the crankcase 6, the second sector 42 adjoins the first sector 41 in the clockwise direction. The second sector 42 contains one outlet-proximal transfer window 16 and one inlet-proximal transfer window 17. The transfer windows 16 and 17 are completely disposed in the second sector 42. The third sector 43 adjoins the second sector 42 in the clockwise direction. In terms of the longitudinal center axis 50, the third sector 43 is disposed opposite the first sector 41. The outlet opening 13 is completely contained in the third sector 43. In the embodiment the outlet channel 27 is also completely contained in the third sector 43. The fourth sector 44 extends between the first sector 41 and the third sector 43. In terms of the longitudinal center axis 50, the fourth sector 44 is disposed opposite the second sector 42. One inlet-proximal transfer window 17 and one outlet-proximal transfer window 16 are disposed in the fourth sector 44.

The planes 46 and 48, and the planes 47 and 49, respectively, in the embodiment lie in each case in a common plane. In terms of the flow chambers configured in the cylinder 2, the cylinder 2 is configured so as to be symmetrical to a central plane 53 which contains the longitudinal center axis 50 and in each case centrically intersects the first intake channel opening 10 and the outlet opening 13. The transfer channels 14, 15 from the transfer windows 16 and 17 are preferably routed in a helical manner about the longitudinal axis 50 to the third sector 43. It can also be provided that the transfer channels 14 and 15 are routed in the first sector 41.

Figure 3:
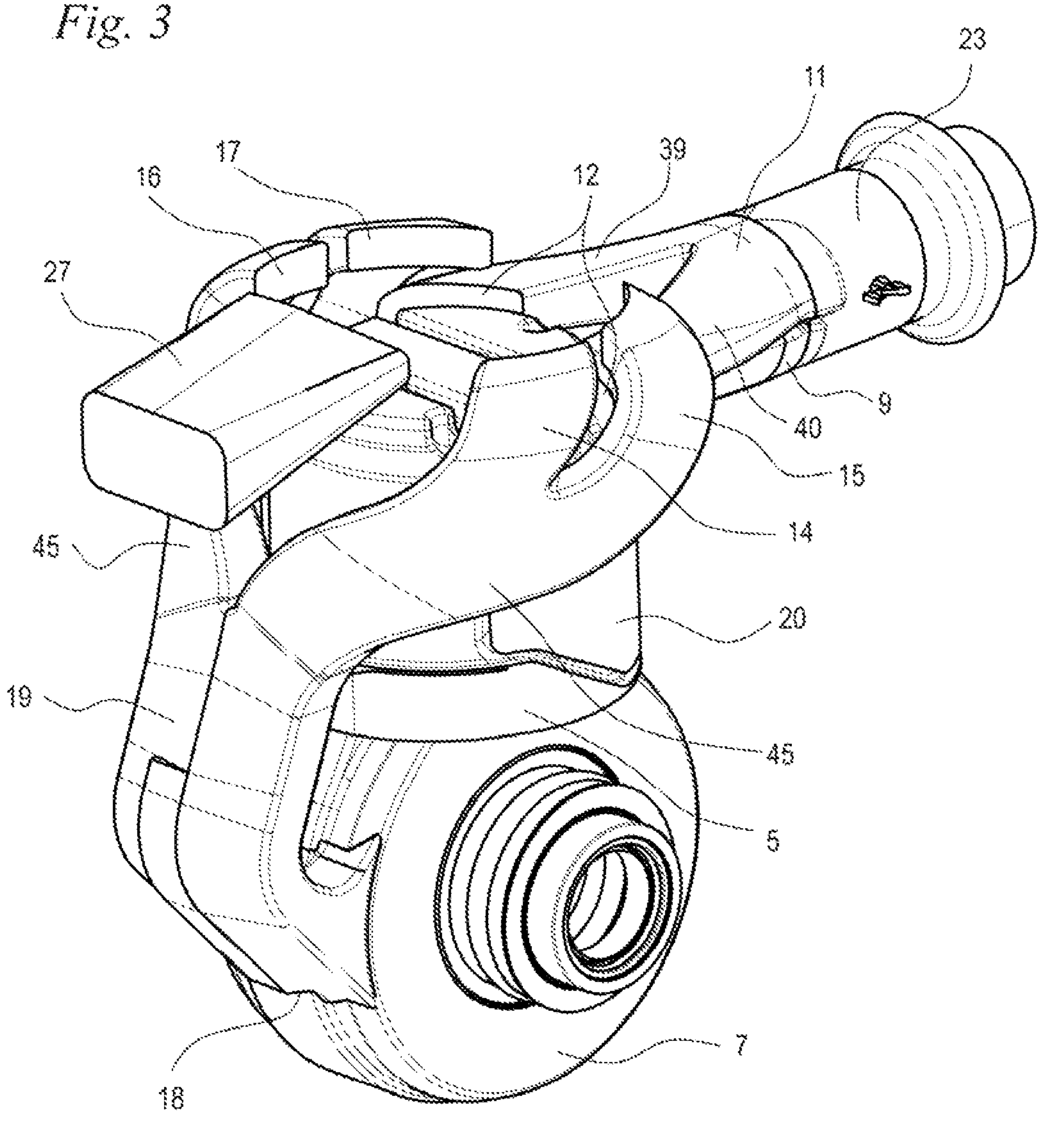
FIG. 3 and FIG. 4 show perspective illustrations of the air-filled interiors of the two-stroke engine, wherein the piston as a filled element, the crankcase interior for the position of the piston at the bottom dead center, and the combustion chamber are not illustrated.

An advantageous embodiment of the channels in cylinder 2 is shown in detail in FIGS. 3 to 7. As is shown in FIG. 3, the second intake channel 11 branches out into two branches 39 and 40 which advantageously run symmetrically to the central plane 53 (FIG. 2). Accordingly, a common channel section 23 which when viewed in the flow direction toward the cylinder 2 branches out into three channels, specifically the first intake channel 9 as well as the two branches 39 and 40 of the second intake channel 11 is provided for supplying air to the two-stroke engine 1. As is shown in FIGS. 2 and 3, the branches 39 and 40 of the second intake channel 11 open out by way of second intake channel openings 12 on the cylinder bore 22. The piston 5 in the embodiment has piston pockets 20 which in the region of the top dead center of the piston 5 connect the transfer windows 16 and 17 to the second intake channel openings 12. On account thereof, scavenging gas shield air can be suctioned into the transfer channels 14 and 15 by way of the second intake channel 11 and the piston pockets 20 in the region of the top dead center of the piston 5.

Figure 4:
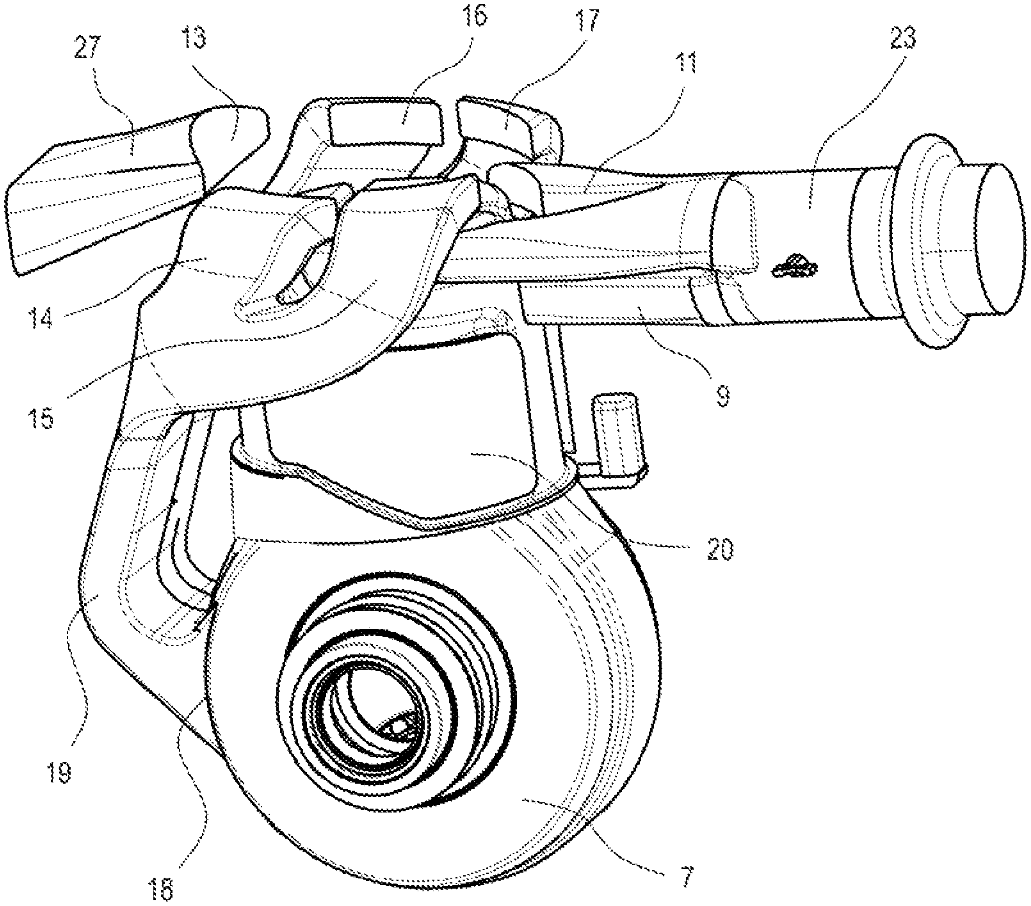
Figure 5:
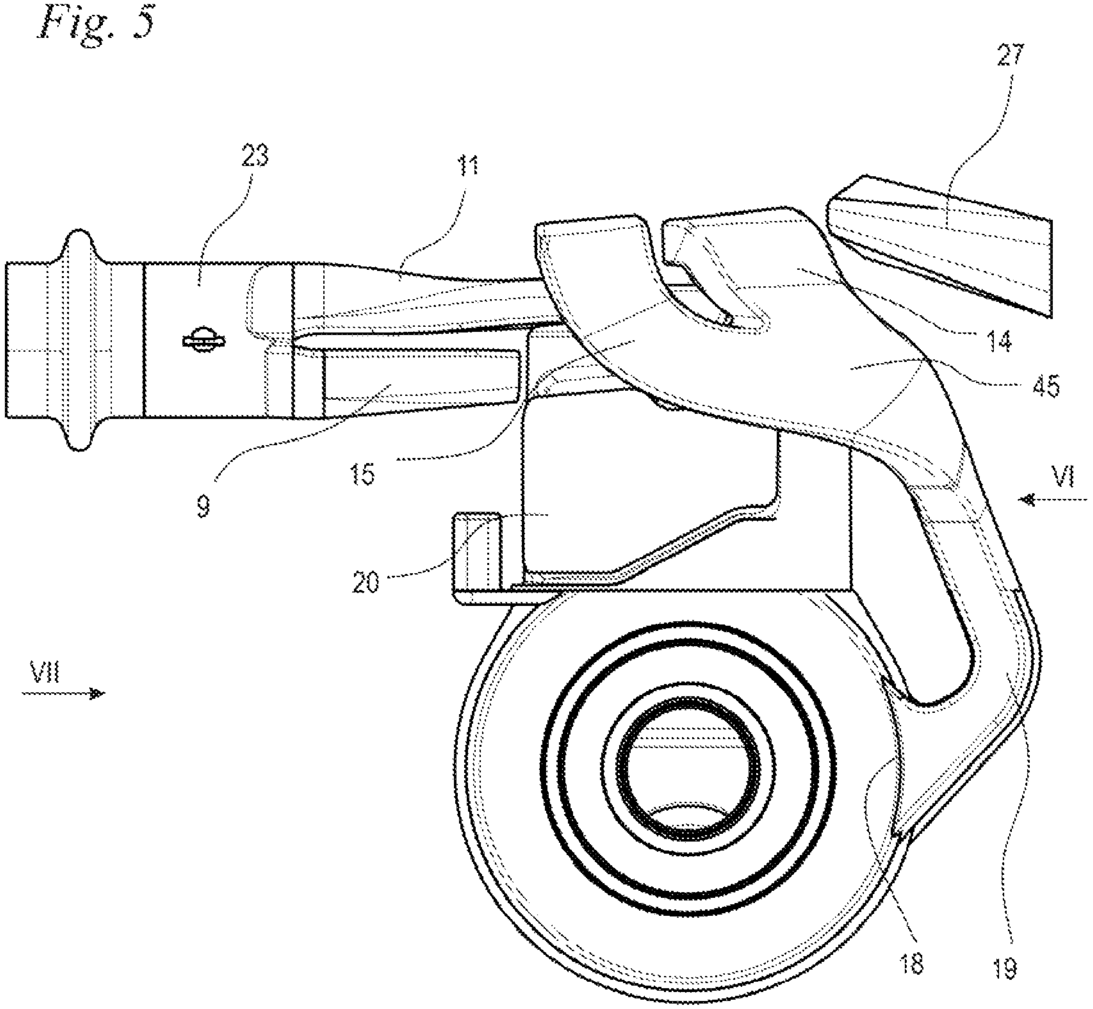
FIG. 5 shows a lateral view of the two-stroke engine illustrated in FIGS. 3 and 4.

FIG. 3 also shows the advantageous disposal of the common transfer channel section 19 in the region below the outlet channel 27. The common transfer channel section 19 is advantageously disposed on that side of the outlet channel 27 that faces the crankcase interior 7. As is derived when viewing FIG. 2 and FIG. 3 in combination, the transfer channels 14 and 15 in the embodiment in the flow direction from the combustion chamber 3 to the crankcase interior 7 are initially converged on each side of the central plane 53 so as to form one transfer channel section 45. The two transfer channel sections 45 of opposite sides of the central plane 53 are then converged and in a common transfer channel section 19 run up to the passage opening 18 where the transfer channels 14, 15 open into the crankcase interior 7. The advantageous disposal of the common transfer channel section 19 on that side of the outlet channel 27 that faces the crankcase 6 (FIG. 1) is also illustrated in FIGS. 4 and 5.

Figure 6:
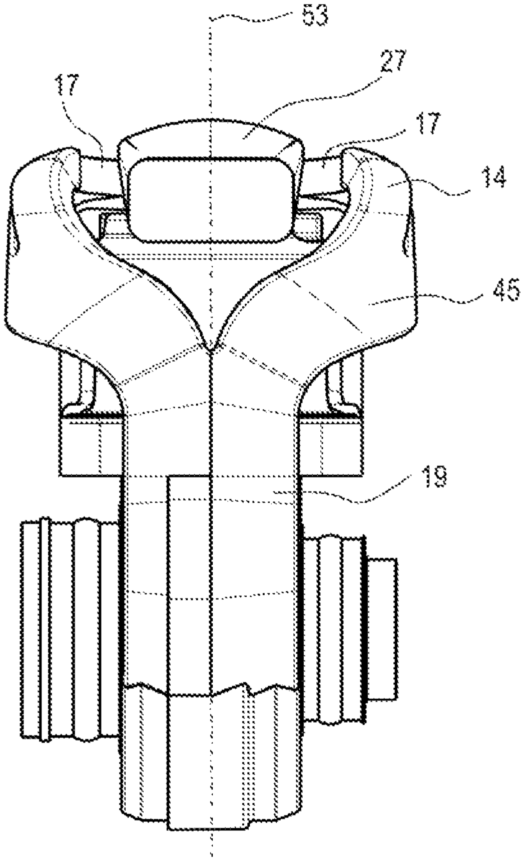
FIG. 6 shows a lateral view in the direction of the arrow VI in FIG. 5.
Figure 7:
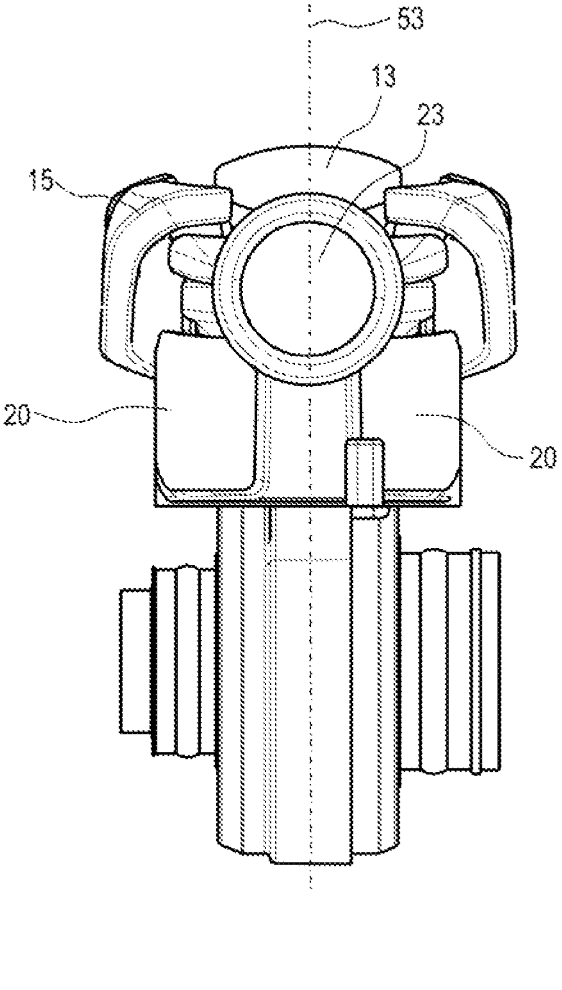
FIG. 7 shows a lateral view in the direction of the arrow VII in FIG. 5.

As is shown in FIGS. 6 and 7, the channels of the two-stroke engine 1 are advantageously configured so as to be symmetrical to the central plane 53. The piston pockets 20 are also advantageously configured so as to be symmetrical to the central plane 53. The symmetrical disposal of the channels and of the piston pockets 20 has the effect of the combustion chamber 3 being uniformly purged with scavenging gas shield air.

Figure 8:
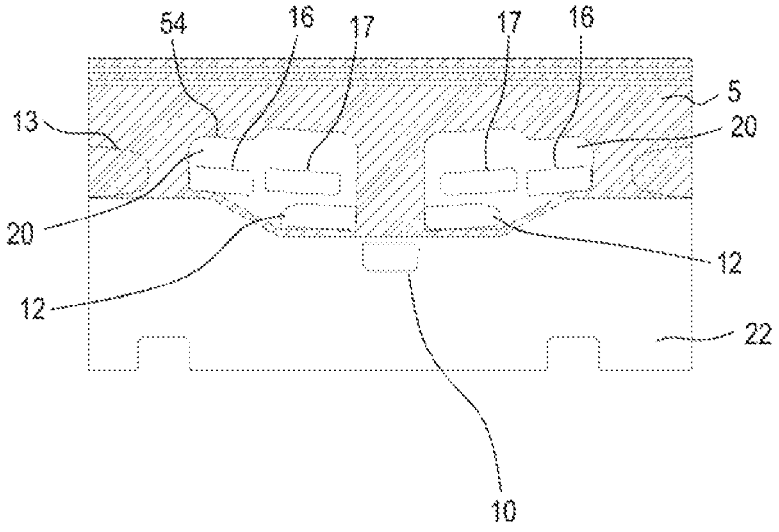
Figure 13:
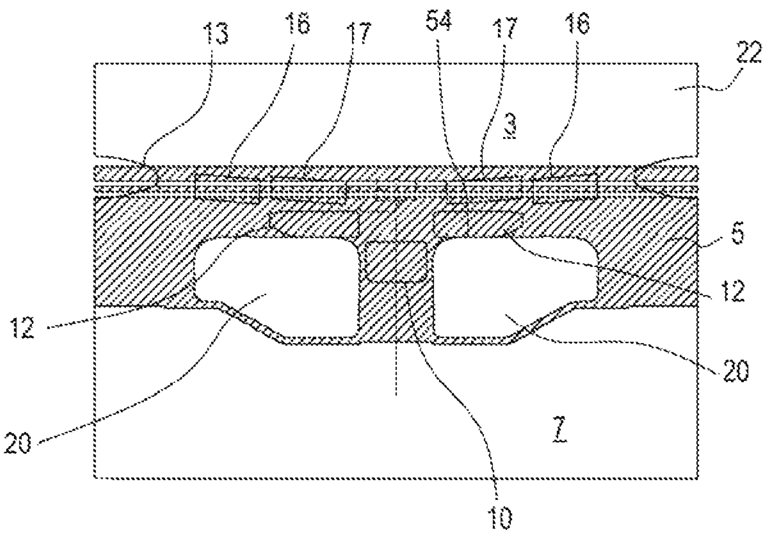
Figure 14:
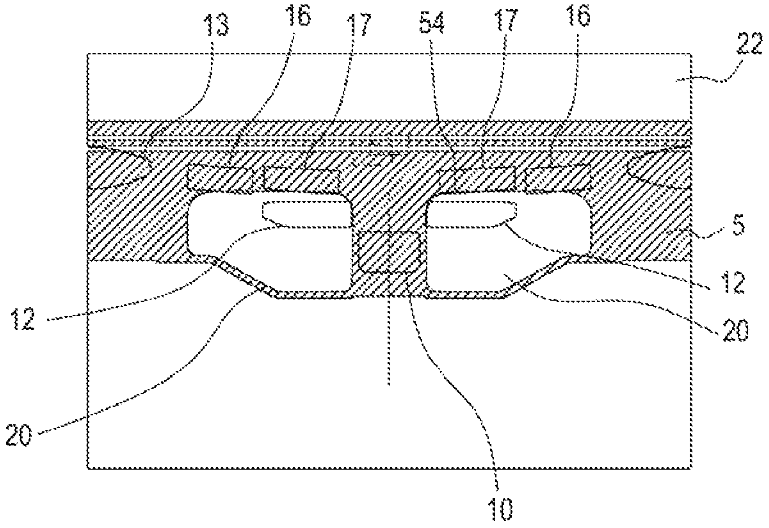
Figure 15:
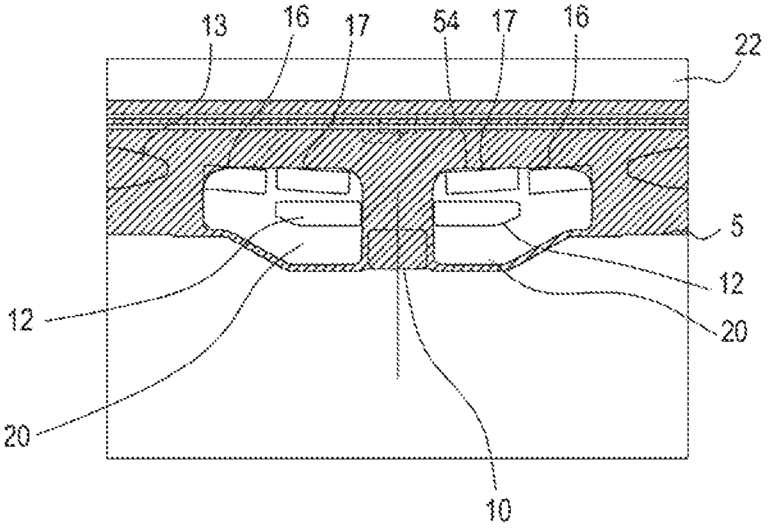

The functional mode of the two-stroke motor 1 when in operation will be explained hereunder via FIGS. 1 and 8 to 15. FIGS. 13 to 15 herein show an alternative embodiment which differs from the embodiment shown in the preceding figures in particular on account of the embodiment of the upper edge 54 of the piston pockets 20. FIG. 8 shows the piston 5 at the top dead center of the piston 5. This corresponds to a crankshaft angle α (FIG. 1) of 0°. FIG. 1 shows the piston 5 in the region of the bottom dead center of the piston 5. The bottom dead center of the piston 5 corresponds to a crankshaft angle α of 180°. At the top dead center of the piston 5 the first intake channel opening 10 is completely opened toward the crankcase interior 7, as is shown in FIG. 8. The transfer windows 16 and 17 are connected to the two second intake channel openings 12 by way of the piston pockets 20. A negative pressure prevails in the crankcase interior 7 such that air from the intake channel opening 12 by way of the piston pockets 20 is suctioned into the transfer channels 14 and 15 through the transfer windows 16 and 17. Air is suctioned through the first intake channel 9 into the crankcase interior 7 by way of the first intake channel opening 10. As is shown in FIG. 8, the upper edge 54 of the piston pockets 20 on the cylinder bore 22 has a stepped profile.

Figure 9:
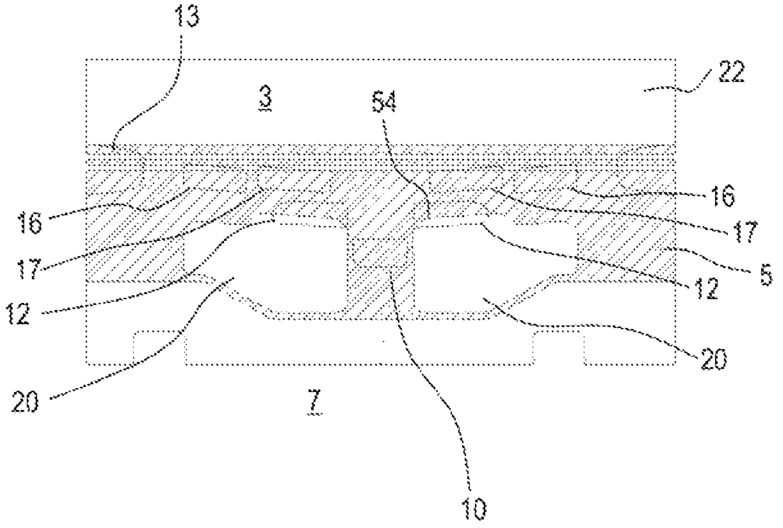

FIG. 9 shows the arrangement at a crankshaft angle α during the downward stroke of the piston 5. In the position of the piston 5 illustrated in FIG. 9 the intake channel opening 10 is closed by the piston skirt of the piston 5. The intake channel openings 12 toward the piston pockets 20 are still open but the transfer windows 16 and 17 are already closed such that shielding air no longer reaches the transfer channels 14 and 15. Combustion air suctioned into the crankcase interior 7 in this position of the piston is compressed by the downward moving piston 5. Moreover, fuel is advantageously supplied to the crankcase interior 7 by way of the injection valve 21. The metering of fuel into the crankcase interior 7 advantageously takes place independently of the position of the piston 5. The outlet opening 13 in the position of the piston 5 shown in FIG. 9 is still just about closed. The outlet opening 13 is opened in a further movement of the piston 5 in the direction to the bottom dead center, and exhaust gases flow out of the combustion chamber 3 and into the outlet channel 27.

Figure 10:
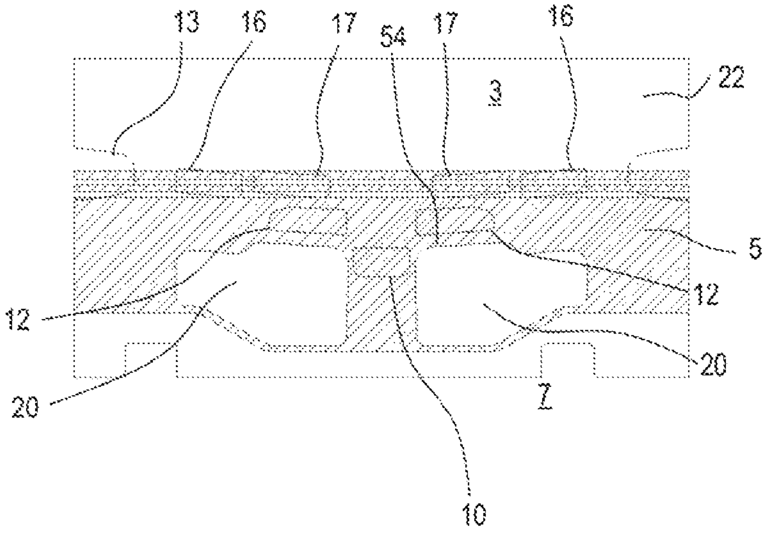

FIG. 10 shows the arrangement in a further downward movement of the piston 5 in a piston position between the top dead center and the bottom dead center. In the position of the piston 5 illustrated in FIG. 10 the outlet-proximal transfer windows 16 start to open toward the combustion chamber 3. The air shielded in the transfer channels 14 flows into the combustion chamber 3 by way of the outlet-proximal transfer channels 14.

Figure 11:
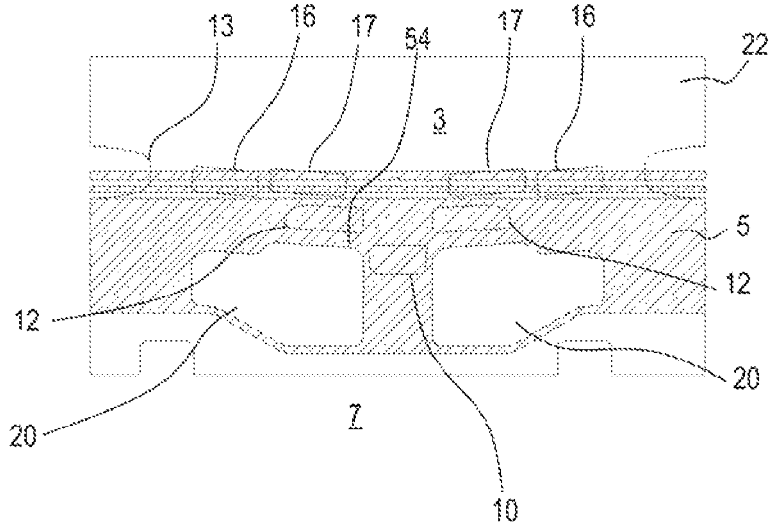

FIG. 11 shows the arrangement after the piston 5 has performed a minor further downward stroke in comparison to the illustration in FIG. 10. At the position of the piston illustrated in FIG. 11 the inlet-proximal transfer channels 15 open toward the combustion chamber 3. At the position of the piston 5 illustrated in FIG. 11, air therefore flows into the combustion chamber 3 also by way of the inlet-proximal transfer windows 17 and the inlet-proximal transfer channels 15. The scavenging gas shield air flowing into the combustion chamber 3 by way of the transfer channels 14 and 15 purges the exhaust gases from the preceding engine cycle out of the combustion chamber 3 through the outlet opening 13.

Figure 12:
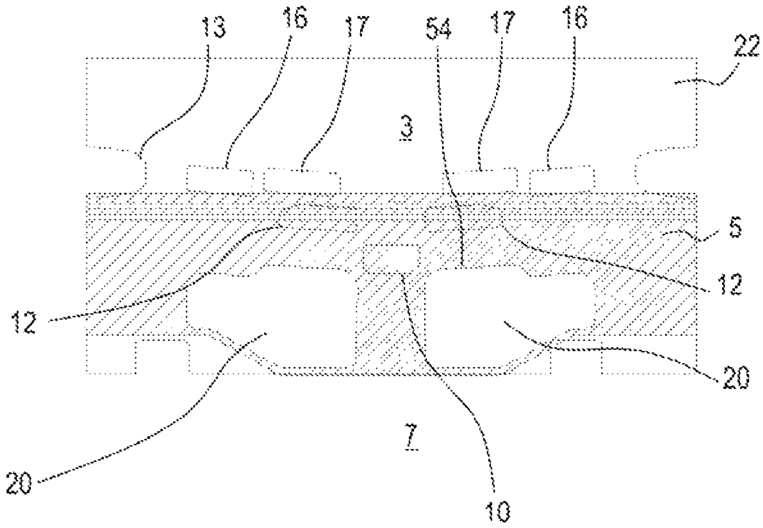

FIG. 12 shows the arrangement at a crankshaft angle of 180°. This corresponds to the bottom dead center. This position is also illustrated in FIG. 1. The piston pockets 20 are closed in this position. The first intake channel opening 10 is also closed. The transfer windows 16 and 17 and the outlet opening 13 are completely open toward the combustion chamber 3. As soon as the air shielded in the transfer channels 14 and 15 has flowed into the combustion chamber 3 a fuel/air mixture from the crankcase interior 7 subsequently flows into the combustion chamber 3 by way of the transfer windows 16 and 17.

In the following upward stroke of the piston 5 the transfer windows 16 and 17 are closed by the piston 5. The second intake channel openings 12 start to open toward the piston pockets 20. This position is shown in FIG. 13.

A fuel/air mixture disposed in the combustion chamber 3 is compressed during the upward stroke of the piston 5, and at a piston position in the region of the top dead center or before the top dead center is ignited by the spark plug 35.

FIG. 14 shows the arrangement after a further upward stroke of the piston 5. In the position illustrated in FIG. 14 the inlet-proximal transfer windows 17 and the outlet-proximal transfer windows 16 open toward the piston pocket 20. In an alternative embodiment the transfer windows 16 and 17 may also open toward the piston pockets at different times, in particular in the case of the stepped profile of the upper edge 54 of the piston pockets 20 illustrated in FIGS. 8 to 12. The second intake channel 11 is connected by way of the intake channel openings 12, and the piston pockets 20 are connected to the transfer channels 14 and 15 by way of the transfer windows 16 and 17, such that the scavenging gas shield air can flow into the transfer channels 14 and 15. The combustion chamber 3 is closed. The first intake channel opening 10 is closed off by the piston skirt of the piston 5.

FIG. 15 shows the arrangement after a further upward stroke of the piston 5. In this position the first intake channel opening 10 starts to open toward the crankcase interior 7. The transfer windows 16 and 17 in this position are completely opened, and the transfer windows 16 are almost completely open toward the piston pockets 20.

In the embodiment the first intake channel opening 10 opens after the transfer windows 16 and 17 have opened toward the piston pockets 20. The connection between the second intake channel openings 12 and the transfer channels 14 and 15 in the upward stroke of the piston 5 is performed before the connection between the first intake channel opening 10 and the crankcase interior 7. The connection between the second intake channel opening 12 and the at least one transfer channel 14, 15 by way of the at least one piston pocket 20 during the upward stroke of the piston 5 is advantageously performed at least 5° in terms of the crankshaft angle α, in particular at least 15° in terms of the crankshaft angle α, before the connection between the first intake channel opening 10 and the crankcase interior 7. The connection between the second intake channel opening 12 and the at least one transfer channel 14, 15 during the upward stroke of the piston 5 is advantageously performed at most 70° in terms of the crankshaft angle α, preferably at most 40° in terms of the crankshaft angle α, before the connection between the first intake channel opening 10 and the crankcase interior 7. The inlet-proximal transfer window 17 in the upward stroke of the piston 5 in the embodiment is connected to the piston pocket 20 before the outlet-proximal transfer window 16. The inlet-proximal transfer window 17 during the upward stroke of the piston 5 herein is advantageously connected to the piston pocket 20 at most 10° in terms of the crankshaft angle α, in particular 10° to 4° in terms of the crankshaft angle α, before the outlet-proximal transfer window 16.

It may be provided that the inlet-proximal transfer window 17 and the outlet-proximal transfer window 16 during the downward stroke of the piston 5 open simultaneously into the combustion chamber 3. The crankshaft angle α which lies between the opening of the inlet-proximal transfer window 17 and the opening of the outlet-proximal transfer window 16 into the combustion chamber 3 is advantageously less than 10° in terms of the crankshaft angle α, in particular less than 5° in terms of the crankshaft angle α.

The second intake channel 11 is preferably configured for supplying at least half of the entire quantity of air to be supplied to the two-stroke engine 1 at the nominal rotating speed. In particular, the second intake channel 11 supplies 60% to 90%, preferably 65% to 75%, of the entire quantity of air to be supplied to the two-stroke engine 1 at the nominal rotating speed. The nominal rotating speed herein is the rotating speed of the two-stroke engine 1 at the rated output.

In an alternative embodiment the inlet-proximal transfer window 17 can be connected to the piston pocket 20 simultaneously with the outlet-proximal transfer window 16.

In a further alternative embodiment it can also be provided that the inlet-proximal transfer window 17 is connected to the piston pocket 20 after the outlet-proximal transfer window 16.

Figure 16:
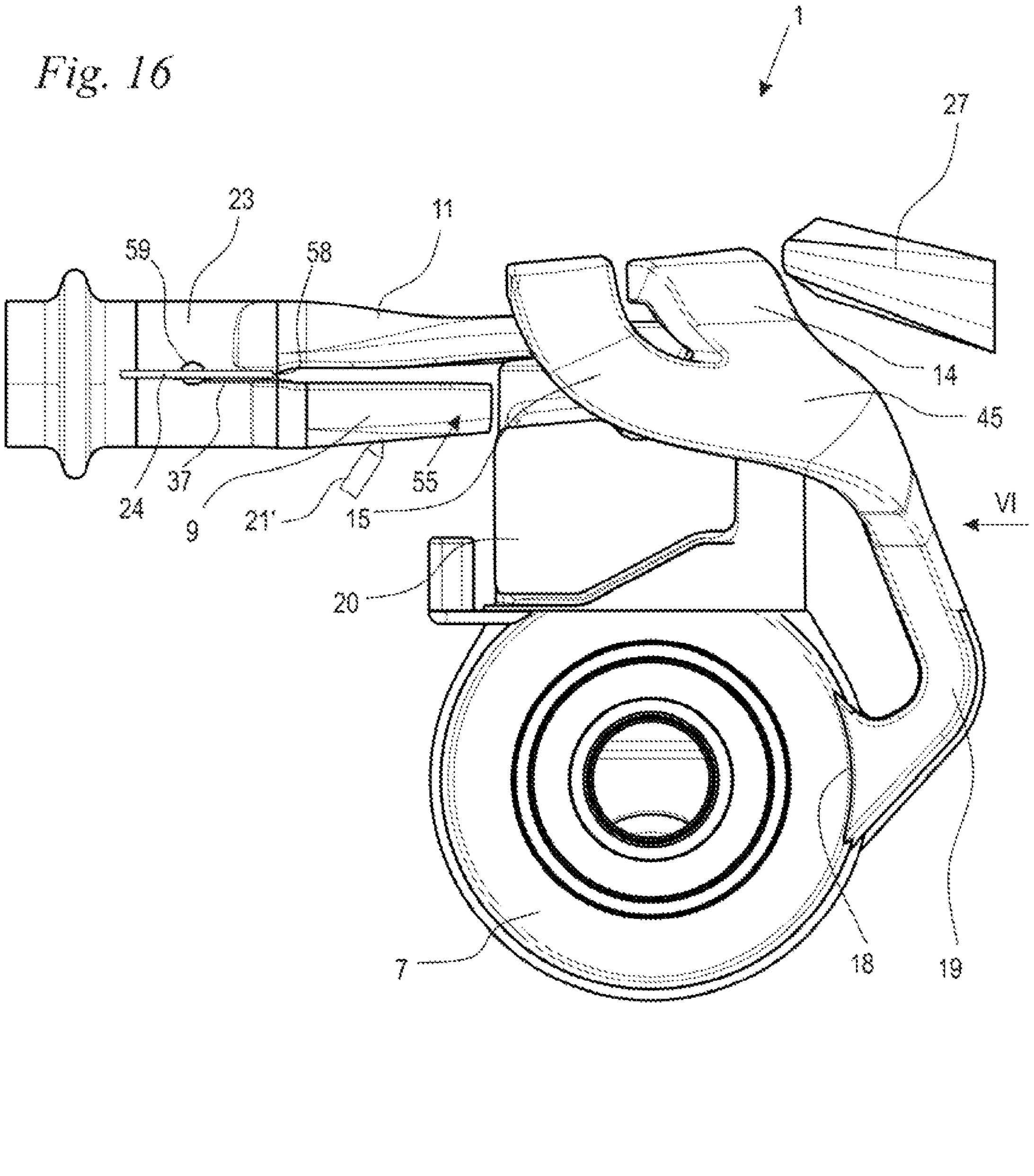
Figure 17:
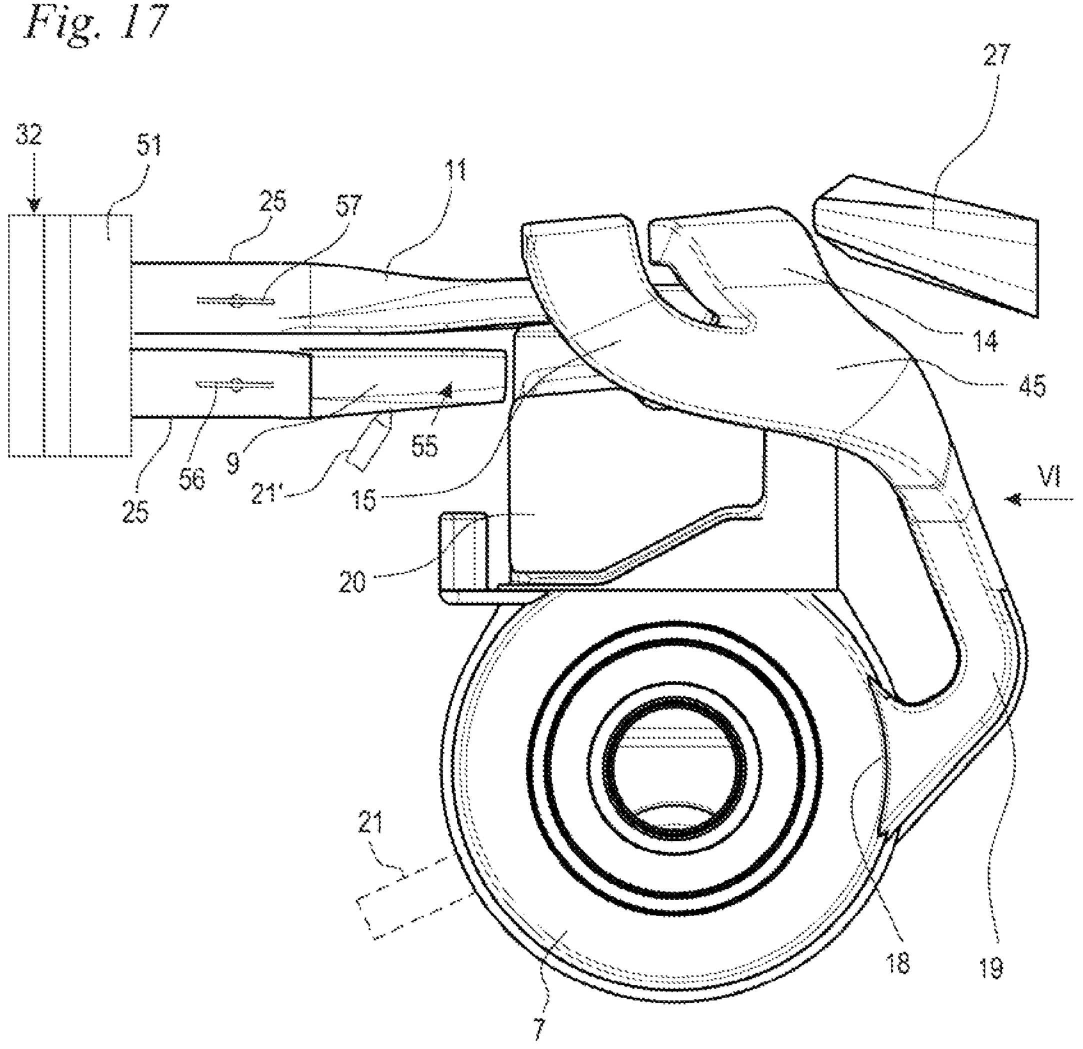

FIGS. 16 and 17 show further alternative embodiments for a two-stroke engine 1. The same reference signs herein identify corresponding elements as in the preceding figures. Unless otherwise stated, the fundamental construction of the two-stroke engines 1 from FIGS. 16 and 17 corresponds to that of the preceding figures such that reference to this end is made to the description of the preceding figures.

The construction of the two-stroke engine 1 from FIG. 16 differs from the embodiments of the preceding figures in terms of the disposal of the injection valve 21. In the two-stroke engine 1 as per FIG. 16, an injection valve 21' which supplies the fuel to the first intake channel 9 is provided. The injection valve 21' supplies the fuel downstream of the downstream edge 58 of the throttle element 24 in the position under full load. The entire fuel which is supplied to the two-stroke engine 1 when in operation herein is supplied to the first flow path 55 downstream of the downstream edge 58 of the throttle element 24 in the position under full load. On account thereof it can largely be prevented that the fuel by virtue of pulsations can make its way into the first intake channel 11. In the embodiment the entire fuel to be supplied to the two-stroke engine is supplied by way of the injection valve 21'.

In the embodiment as per FIG. 16 the throttle element 24 is pivotably mounted by way of a throttle shaft 59. The throttle element 24 herein is advantageously a throttle flap. The throttle element 24 can however also be a carburetor drum, wherein the carburetor drum simultaneously forms the throttle shaft 59. The partition wall section 37 which is disposed downstream of the throttle shaft 59 extends right up to the throttle shaft 59. The intake channels 9 and 11 downstream of the throttle shaft 59 are thus routed so as to be completely separate from one another.

The embodiment as per FIG. 17 differs from the embodiments of the preceding figures in terms of the embodiment of the intake channels 9 and 11. The intake channels 9 and 11 are not controlled by a common throttle element. A first throttle element 56 which is disposed in a throttle housing 25 is disposed in the first intake channel 9. A second throttle element 57 is disposed in the second intake channel. The second throttle element is advantageously disposed in a second throttle housing 25. Alternatively, both throttle elements 56 and 57 can be guided separately from one another in a common throttle housing. The intake channels 9 and 11, at least up to directly upstream of the throttle elements 56 and 57, are routed so as to be completely separate from one another. The intake channels 9 and 11 are advantageously routed so as to be completely separate from one another up to the clean room 51 of the air filter 32.

The supply of fuel advantageously takes place to the first flow path 55. To this end, an injection valve 21' which supplies to the first intake channel 9 the entire fuel to be supplied to the two-stroke engine 1 when in operation is advantageously provided. The supply of fuel takes place in particular downstream of the first throttle element 56. Alternatively, an injection valve 21 which in FIG. 17 is schematically plotted with the dashed line can be provided. The injection valve 21 is disposed on the crankcase 6 (see FIG. 1) and supplies the entire quantity of fuel to be supplied to the crankcase interior 7. The first intake channel 9 and the crankcase interior 7 herein form the first flow path 55 to which the fuel is supplied.

The indications "downstream" and "upstream" presently refer in principle to the flow direction from the air filter 32 to the cylinder 2, or to the crankcase 6, respectively.

It is understood that the foregoing description is that of the preferred embodiments of the invention and that various changes and modifications may be made thereto without departing from the spirit and scope of the invention as defined in the appended claims.

The invention claimed is:

1. A two-stroke engine comprising:

a cylinder having a combustion chamber formed therein;

a piston configured to be guided in a reciprocating manner in said cylinder;

said combustion chamber being delimited by said piston;

a crankcase defining a crankcase interior;

a crankshaft rotatably mounted in said crankcase;

said piston being configured to drive said crankshaft;

a first intake channel which opens into said crankcase interior via a first intake channel opening;

said first intake channel and said crankcase interior forming a first flow path;

said combustion chamber having an outlet opening;

said cylinder having a cylinder bore;

at least one transfer channel opening via a transfer window at said cylinder bore and opening into the crankcase interior via a passage opening;

said at least one transfer channel being configured to establish a fluidic connection between said crankcase interior and said combustion chamber in a region of bottom dead center of said piston;

a second intake channel configured to supply scavenging air to said at least one transfer channel;

a common throttle element configured to control said first intake channel and said second intake channel;

said common throttle element being pivotably mounted via a throttle shaft;

wherein a connection between said second intake channel and said at least one transfer channel and a connection between said first intake channel opening and said crankcase interior are controlled as a function of a rotary position of the crankshaft; and, an injection valve for supplying fuel, said injection valve being configured to supply to the first flow path an entire quantity of fuel to be supplied to the two-stroke engine.

2. The two-stroke engine of claim 1, wherein said injection valve is configured to supply the entire quantity of fuel to be supplied to said first intake channel.

3. The two-stroke engine of claim 2, wherein said injection valve is configured to supply the fuel downstream of a downstream edge of said throttle element in a full load position.

4. The two-stroke engine of claim 1, wherein said first intake channel and said second intake channel are separate from each other at least downstream of said throttle shaft.

5. The two-stroke engine of claim 1, wherein said injection valve is configured to supply an entire amount of fuel to be supplied to the two-stroke engine directly to said crankcase interior.

6. The two-stroke engine of claim 5, wherein said injection valve is disposed on the crankcase.

7. The two-stroke engine of claim 1, wherein said first intake channel opening is controlled by said piston.

8. The two-stroke engine of claim 1, wherein said second intake channel opens out via at least one second intake channel opening at said cylinder bore.

9. The two-stroke engine of claim 8, wherein said piston has at least one piston pocket; and, said piston pocket, in a region of top dead center of said piston, connects said second intake channel opening to said at least one transfer window.

10. The two-stroke engine of claim 9, wherein the connection between said second intake channel opening and said at least one transfer channel via said at least one piston pocket is performed during an upward stroke of said piston, prior to said first intake channel opening being connected to said crankcase interior.

11. The two-stroke engine of claim 1, wherein said at least one transfer channel includes at least one inlet-proximal transfer channel and at least one outlet-proximal transfer channel; said inlet-proximal transfer channel opens out via an inlet-proximal transfer window at the cylinder bore; and, said outlet-proximal transfer channel opens out via an outlet-proximal transfer window at said cylinder bore.

12. The two-stroke engine of claim 11, wherein, during an upward stroke of said piston, said inlet-proximal transfer window is connected to said piston pocket before or simultaneously with said outlet-proximal transfer window.

13. The two-stroke engine of claim 12, wherein, during the upward stroke of the piston, said inlet-proximal transfer window, in terms of a crankshaft angle ($\alpha$), is connected to said piston pocket at most 10° before said outlet-proximal transfer window.

14. The two-stroke engine of claim 13, wherein said inlet-proximal transfer window and said outlet-proximal transfer window, during a downward stroke of the piston, open simultaneously into said combustion chamber; or, said outlet-proximal transfer windows opens into said combustion chamber before said inlet-proximal transfer window.

15. The two-stroke engine of claim 14, wherein said passage opening is a common passage opening at which said outlet-proximal transfer channel and said inlet-proximal transfer channel conjointly open into said crankcase interior.

16. The two-stroke engine of claim 15, wherein said cylinder defines a longitudinal center axis; the two-stroke engine, when viewed in a direction of the longitudinal center axis, is divisible into a first sector, a second sector, a third sector and a fourth sector; the first sector completely contains said first intake channel opening; the second sector is adjacent to the first sector and contains said outlet-proximal transfer window and said inlet-proximal transfer window; the third sector is adjacent to the second sector and completely contains said outlet opening; the fourth sector is adjacent to the first sector and the third sector; and, wherein said passage opening at which the outlet-proximal transfer channel and the inlet-proximal transfer channel conjointly open into the crankcase interior is disposed in a common sector that is adjacent to the second sector.

17. The two-stroke engine of claim 16, wherein said passage opening is disposed in the third sector.

18. The two-stroke engine of claim 16, wherein said outlet-proximal transfer window and said inlet-proximal transfer window are disposed in the fourth sector.

19. The two-stroke engine of claim 15, wherein all of said transfer channels have a common transfer channel section adjoining said passage opening.

20. The two-stroke engine of claim 1, wherein said first intake channel opening is opened toward said crankcase interior at a top dead center of said piston.

21. The two-stroke engine of claim 1, wherein said second intake channel is configured to supply at least half of an entire quantity of air to be supplied to the two-stroke engine at a nominal rotating speed.

22. A two-stroke engine comprising:

a cylinder having a combustion chamber formed therein;

a piston configured to be guided in a reciprocating manner in said cylinder;

said combustion chamber being delimited by said piston;

a crankcase defining a crankcase interior;

a crankshaft rotatably mounted in said crankcase;

said piston being configured to drive said crankshaft;

a first intake channel which opens into said crankcase interior via a first intake channel opening;

said first intake channel and said crankcase interior forming a first flow path;

a throttle element disposed in said first intake channel;

said combustion chamber having an outlet opening;

said cylinder having a cylinder bore;

at least one transfer channel opening out via a transfer window at said cylinder bore and opening into said crankcase interior via a passage opening;

said at least one transfer channel being configured to establish a fluidic connection between said crankcase interior and said combustion chamber in a region of bottom dead center of said piston;

a second intake channel for supplying scavenging air to said at least one transfer channel;

wherein a connection between said second intake channel and said at least one transfer channel and a connection between said first intake channel opening and said crankcase interior as a function of a rotary position of said crankshaft are controlled in such a manner that said connection between said second intake channel and said at least one transfer channel during an upward stroke of said piston is established before said connection between said first intake channel opening and said crankcase interior; and, a metering device for supplying fuel, said metering device being configured to supply to said first flow path an entire quantity of fuel to be supplied to the two-stroke engine downstream of said throttle element.

23. The two-stroke engine of claim 22, wherein the second intake channel is configured for supplying at least half of the entire quantity of air to be supplied to the two-stroke engine at a nominal rotating speed.

24. The two-stroke engine of claim 22, wherein said metering device for supplying fuel is an injection valve.

25. The two-stroke engine of claim 22, wherein said first intake channel opening is controlled by said piston.

26. The two-stroke engine of claim 22, wherein said second intake channel opens out via at least one second intake channel opening at said cylinder bore.

27. The two-stroke engine of claim 24, wherein said piston has at least one piston pocket; and, said piston pocket, in a region of top dead center of said piston, connects said second intake channel opening to said at least one transfer window.

28. The two-stroke engine of claim 22, wherein said at least one transfer channel includes at least one inlet-proximal transfer channel and at least one outlet-proximal transfer channel; said inlet-proximal transfer channel opens out via an inlet-proximal transfer window at the cylinder bore; and, said outlet-proximal transfer channel opens out via an outlet-proximal transfer window at said cylinder bore.

29. The two-stroke engine of claim 28, wherein, during an upward stroke of said piston, said inlet-proximal transfer window is connected to said piston pocket before or simultaneously with said outlet-proximal transfer window.

30. The two-stroke engine of claim 29, wherein, during the upward stroke of the piston, said inlet-proximal transfer window, in terms of a crankshaft angle ($\alpha$), is connected to said piston pocket at most 10° before said outlet-proximal transfer window.

31. The two-stroke engine of claim 28, wherein said inlet-proximal transfer window and said outlet-proximal transfer window, during a downward stroke of the piston, open simultaneously combustion chamber before said inlet-proximal transfer window.

32. The two-stroke engine of claim 28, wherein said passage opening is a common passage opening at which said outlet-proximal transfer channel and said inlet-proximal transfer channel conjointly open into said crankcase interior.

33. The two-stroke engine of claim 32, wherein said cylinder defines a longitudinal center axis; the two-stroke engine, when viewed in a direction of the longitudinal center axis, is divisible into a first sector, a second sector, a third sector and a fourth sector; the first sector completely contains said first intake channel opening; the second sector is adjacent to the first sector and contains said outlet-proximal transfer window and said inlet-proximal transfer window; the third sector is adjacent to the second sector and completely contains said outlet opening; the fourth sector is adjacent to the first sector and the third sector; and, wherein said passage opening at which the outlet-proximal transfer channel and the inlet-proximal transfer channel conjointly open into the crankcase interior is disposed in a common sector that is adjacent to the second sector.

34. The two-stroke engine of claim 22, wherein said first intake channel opening is opened toward said crankcase interior at a top dead center of said piston.

35. A two-stroke engine comprising:

a cylinder having a combustion chamber formed therein;

a piston configured to be guided in a reciprocating manner in said cylinder;

said combustion chamber being delimited by said piston;

a crankcase defining a crankcase interior;

a crankshaft rotatably mounted in said crankcase;

said piston being configured to drive said crankshaft;

a first intake channel which opens into said crankcase interior via a first intake channel opening;

said first intake channel and said crankcase interior forming a first flow path;

a first throttle element arranged in said first intake channel;

said combustion chamber having an outlet opening;

said cylinder having a cylinder bore;

at least one transfer channel opening via a transfer window at said cylinder bore and opening into the crankcase interior via a passage opening;

said at least one transfer channel being configured to establish a fluidic connection between said crankcase interior and said combustion chamber in a region of bottom dead center of said piston;

a second intake channel configured to supply scavenging air to said at least one transfer channel;

a second throttle element arranged in said at least one second intake channel;

said first intake channel and said second intake channel being formed separate from each other;

wherein a connection between said second intake channel and said at least one transfer channel and a connection between said first intake channel opening and said crankcase interior are controlled as a function of a rotary position of said crankshaft; and, an injection valve for supplying fuel, said injection valve being configured to supply an entire quantity of fuel to be supplied to the two-stroke engine to said first flow path.

36. The two-stroke engine of claim 35, wherein said first intake channel opening is controlled by said piston.

37. The two-stroke engine of claim 36, wherein said second intake channel opens out via at least one second intake channel opening at said cylinder bore.

38. The two-stroke engine of claim 37, wherein said piston has at least one piston pocket; and, said piston pocket, in a region of top dead center of said piston, connects said second intake channel opening to said at least one transfer window.

39. The two-stroke engine of claim 38, wherein the connection between said second intake channel opening and said at least one transfer channel via said at least one piston pocket is performed during an upward stroke of said piston, prior to said first intake channel opening being connected to said crankcase interior.

40. The two-stroke engine of claim 35, wherein said at least one transfer channel includes at least one inlet-proximal transfer channel and at least one outlet-proximal transfer channel; said inlet-proximal transfer channel opens out via an inlet-proximal transfer window at the cylinder bore; and, said outlet-proximal transfer channel opens out via an outlet-proximal transfer window at said cylinder bore.

41. The two-stroke engine of claim 40, wherein, during an upward stroke of said piston, said inlet-proximal transfer window is connected to said piston pocket before or simultaneously with said outlet-proximal transfer window.

42. The two-stroke engine of claim 41, wherein, during the upward stroke of the piston, said inlet-proximal transfer window, in terms of a crankshaft angle (α), is connected to said piston pocket at most 10° before said outlet-proximal transfer window.

43. The two-stroke engine of claim 40, wherein said inlet-proximal transfer window and said outlet-proximal transfer window, during a downward stroke of the piston, open simultaneously into said combustion chamber; or, said outlet-proximal transfer window opens into said combustion chamber before said inlet-proximal transfer window.

44. The two-stroke engine of claim 40, wherein said passage opening is a common passage opening at which said outlet-proximal transfer channel and said inlet-proximal transfer channel conjointly open into said crankcase interior.

45. The two-stroke engine of claim 44, wherein said cylinder defines a longitudinal center axis; the two-stroke engine, when viewed in a direction of the longitudinal center axis, is divisible into a first sector, a second sector, a third sector and a fourth sector; the first sector completely contains said first intake channel opening; the second sector is adjacent to the first sector and contains said outlet-proximal transfer window and said inlet-proximal transfer window; the third sector is adjacent to the second sector and completely contains said outlet opening; the fourth sector is adjacent to the first sector and the third sector; and, wherein said passage opening at which the outlet-proximal transfer channel and the inlet-proximal transfer channel conjointly open into the crankcase interior is disposed in a common sector that is adjacent to the second sector.

46. The two-stroke engine of claim 35, wherein said first intake channel opening is opened toward said crankcase interior at a top dead center of said piston.

* * * * *